United States Patent [19]

Uehara

[11] Patent Number: 4,566,930
[45] Date of Patent: Jan. 28, 1986

[54] PROCESS FOR PRODUCING OPTICAL MEMBERS

[75] Inventor: Haruo Uehara, Yokohama, Japan

[73] Assignee: Canon Kabushiki Kaisha, Tokyo, Japan

[21] Appl. No.: 653,727

[22] Filed: Sep. 24, 1984

[30] Foreign Application Priority Data

Sep. 30, 1983 [JP] Japan ................................. 58-184137
Sep. 30, 1983 [JP] Japan ................................. 58-184138
Sep. 30, 1983 [JP] Japan ................................. 58-184139

[51] Int. Cl.$^4$ ........................ B32B 31/06; B32B 31/12
[52] U.S. Cl. .................................... 156/280; 156/289; 156/295; 156/344; 264/1.7; 264/2.3; 350/417
[58] Field of Search ............... 51/216 LP, 277; 65/37; 156/245, 280, 289, 295, 344; 264/1.7, 2.3; 350/417

[56] References Cited

U.S. PATENT DOCUMENTS

| | | | |
|---|---|---|---|
| 3,931,373 | 1/1976 | Beattie ........................ | 350/417 X |
| 3,935,292 | 1/1976 | Okubo et al. ................ | 264/2.3 X |
| 4,146,696 | 3/1979 | Bond et al. .................. | 264/2.3 X |
| 4,159,292 | 6/1979 | Neefe ......................... | 264/2.3 |
| 4,267,208 | 5/1981 | Ireland ....................... | 51/216 LP X |
| 4,432,832 | 2/1984 | Fantone ...................... | 264/1.7 X |

*Primary Examiner*—Robert A. Dawson
*Attorney, Agent, or Firm*—Fitzpatrick, Cella, Harper & Scinto

[57] ABSTRACT

A process for producing an optical member comprises forming a resin layer on the surface of a glass substrate by filling with a resin the gap between a master having a releasing layer on the surface and a glass substrate and separating the master to produce an optical member constituted of a glass substrate and a resin layer and the releasing layer is comprised of a compound having a fluorine-substituted hydrocarbon group and an alkoxysilane group or a silane halide group. The releasing layer may be treated with an amine or an acid so as to form a rigid adherence between the compound forming the releasing layer and the surface of the master by chemical bonding. The releasing layer is subjected, if desired, to a thin film-forming treatment. The thin film-forming treatment is carried out, for example, by ultrasonic cleaning.

28 Claims, 6 Drawing Figures

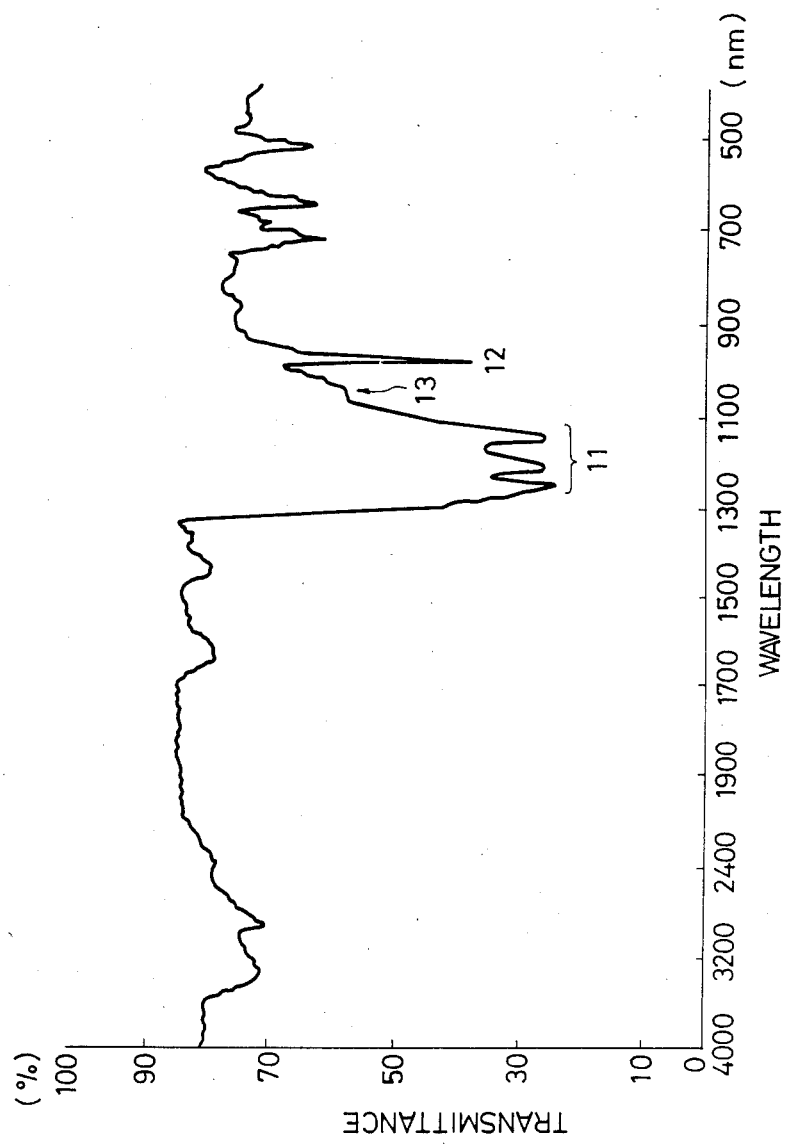

PROCESS FOR PRODUCING OPTICAL MEMBERS

BACKGROUND OF THE INVENTION

Field of the Invention

This invention relates to a process for producing optical members.

Most of optical members such as lens, mirror, filter and the like, are formed of glass.

Glass has various kinds, and glass optical members of various characteristics can be produced depending on demand, and further, optical surfaces such as plane and spherical surfaces can be formed with a high precision by grinding. However, grinding takes a long time and the processing cost is disadvantageously high. In addition, in the case of production of aspherical optical elements, the processing cost becomes much higher.

Other process for producing optical members capable of solving these drawbacks is a process of shaping a transparent resin by pouring a resin into a mold, so-called, a process for fabricating a plastic lens. According to this process, a grinding processing is not necessary, and when appropriate conditions are selected, the plastic optical members can be fabricated at a low cost by mass production. However, it is not easy to produce optical members having high optical precision, and the plastic materials are poorer than glass materials with respect to physical and chemical properties, and have particularly drawbacks that coefficient of thermal expansion and change of refractive index due to heat are large, and strain and formation of recess are internally formed upon processing.

As a method for complementing the drawbacks of glass materials and resin materials, there is a method of producing an optical member composed of both plastic material and glass material. This method comprises disposing near a glass substrate and a master having an optical surface of an optical member to be formed, sandwiching a resin therebetween or pouring a resin therebetween, solidifying the resin to form a resin layer between the glass substrate and the master, and separating the glass substrate from the master resulting in the production of an optical member constituted of a glass substrate and a resin layer.

According to this method, it is necessary to grind precisely the glass substrate to some extent, but an optical precision as an optical member can be obtained by the resin layer so that the grinding of the glass itself can be reduced to a great extent. Moreover, since the resin layer is a thin film, the resin layer is affected only little by thermal expansion and change in refractive index and the formation of strain and formation of recess can be suppressed to the minimum.

Optical members having an aspherical surface such as aspherical lenses can be also easily produced in a way similar to the production of optical members having a spherical surface by rendering the shape of the master aspheric. One of the biggest problems of the method using a master is that, after forming a resin layer between a master and a glass substrate, it is not easy to separate the glass substrate from the master without damaging the optical surface of the resin layer. In order to avoid such damage, a material preventing adhesion with a master and enabling the releasing easy has been incorporated in the resin material. Example of such material are silicone oil, various waxes and the like. In many cases, these materials are not or less compatible with the resin materials so that the materials ooze to the surface of the resin layer resulting in releasing. Therefore, the materials often deteriorate mechanical characteristics, transparency, surface physical properties and the like. Further, when a secondary processing such as adhering other optical members is applied to the surface of the resin layer, the material disadvantageously lowers adhesion of the adhesives.

Alternatively, it is generally used that a releasing agent is not mixed with the resin material, but applied to the surface of a master to form a releasing layer to prevent the adhesion between a resin material and a master.

As materials for such releasing layer, there may be used silicone oil, silicone grease, silicone varnish, carnauba wax, mineral wax, fluorine-containing resin powder or coating film, water-soluble resins, glycerine, various oils and fats, stearic acid salts, and the like. However, these releasing agents have not given a sufficient releasing effect. In particular, in the case of precision molding of optical members such as lens, mirror and the like, liquid monomers or oligomers for acrylic resins, expoxy resins and the like are often used as the shaping material, and when the conventional releasing agents are used, adhesion of the poured liquid material with a master often occurs, in particular, a material of excellent adhesion such as epoxy resin is liable to adhere to a master.

Molding precision at the surface of resin layer is very important for optical members, and therefore, it is desired that a releasing agent is thin as far as possible, but when conventional releasing agents are used, it is not possible to obtain a thin resin layer and when a resin layer is made thin, the releasing layer is often partly peeled off.

In order to avoid such difficulty as above, heretofore, an metallic vapor deposition film such as gold, silver, copper and the like has been used as a releasing layer. The releasing layer may be formed by depositing an extremely thin film of the metal on the surface of a master according to sputtering, vacuum vapor deposition, and the like. On the resulting thin metal film was molded a desired resin material by means of casting, and then releasing is effected. The metallic deposited layer for releasing is taken out in such a form that the metallic deposited layer is attached to the surface of the shaped article. Therefore, at the next stage the metal layer as a releasing layer should be removed. This removing may be carried out by chemically dissolving with acid or alkali, or a mechanical means such as peeling off with an adhesive tape and the like. As a result, the surface of the shaped article is affected by chemicals to cause surface roughness and surface defects and further, a step for removing a releasing layer is disadvantageously necessary.

SUMMARY OF THE INVENTION

An object of the present invention is to provide a process for producing optical members having a surface of a high optical precision by using a releasing material of a good releasing property and capable of being formed into a thin layer.

Another object of the present invention is to provide a process for producing optical members where releasing of the produced optical members is very easy and there can be produced optical members of high precision.

According to the present invention, there is provided a process for producing an optical member comprising forming a resin layer on the surface of a glass substrate by filling with a resin the gap between a master having a releasing layer on the surface and a glass substrate and separating the master to produce an optical member constituted of a glass substrate and a resin layer, characterized in that the releasing layer comprises a compound having a fluorine-substituted hydrocarbon group, and alkoxysilane group or silane halide group.

BRIEF DESCRIPTION OF THE DRAWINGS

The invention will now be described with reference to the accompanying drawings wherein:

FIG. 6 is a graph which shows infrared absorption spectrum characterisitc of the releasing material used in Example.

DESCRIPTION OF THE PREFERRED EMBODIMENTS

Figure 1:
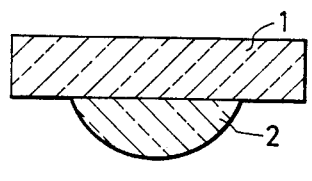
FIG. 1 is a sectional view showing an example of the master used in the present invention.
Figure 2:
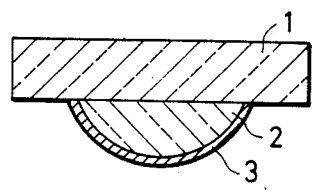
FIG. 2 is a sectional view of the master shown in FIG. 1 having a releasing layer on the surface.

FIG. 1 shows a member constituted of a substrate 1 such as glass, metal and the like and a master 2 fixed to the substrate 1. The surface of master 2 has an optical surface precision corresponding to a surface to be formed, and is composed of glass, metal, or the like. As shown in FIG. 2, a releasing layer 3 is formed on master 2. The releasing layer comprises a compound having a fluorine-substituted hydrocarbon group, and an alkoxysilane group or a silane halide group.

Figure 3:
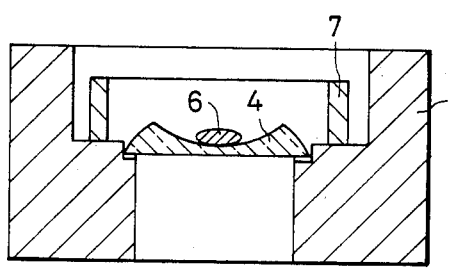
FIG. 3 is a sectional view showing an example of the state in which a glass substrate is put on a support member for forming an optical member according to the present invention.
Figure 4:
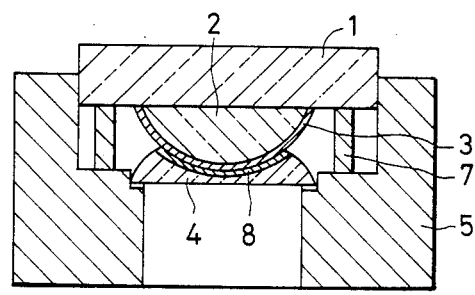
FIG. 4 is a sectional view showing the state in which the master shown in FIG. 2 arranged on the glass substrate shown in FIG. 3.
Figure 5:
FIG. 5 is a sectional view of an optical member formed according to the present invention.

As shown in FIG. 3, a glass substrate 4 is fixedly disposed on a support member 5 and a small amount of a resin 6 is dropped on glass substrate 4. Then, as shown in FIG. 4, master 2 is placed on glass substrate 4 to fill the gap between master 2 and glass substrate 4 with the resin and solidify the resin resulting in the formation of a resin layer 8. A desired gap between the master and the glass substrate can be assured by a spacer 7. Master 2 is then separated from the glass substrate to produce an optical member constituted of resin layer 8 and glass substrate 4 and having an optical surface as shown in FIG. 5.

When the surface of the master is plane, spherical or aspherical, there can be produced various optical members, for example a filter, spherical lens, or aspherical lens, or mirror, spherical mirror, or aspherical mirror, respectively.

In the case of mirrors, they are produced by vapor-depositing a metal such as Al, Ag and the like on the resin layer.

Representative releasing materials used in the present invention are compounds having a fluorine-substituted hydrocarbon group, and an alkoxysilane group (1) or silane halide group (2) of the following general formulas:

where $R_I$ and $R_{II}$ are alkyl such as methyl, ethyl, propyl, butyl and the like; n and m are 1, 2 or 3; $R_{III}$ is alkyl such as methyl, ethyl, proply, butyl and the like, or alkoxy such as methoxy, ethoxy, butoxy and the like; and X is halogen such as Cl, Br and I.

Where two or more of $R_I$, $R_{II}$, $R_{III}$ and X are bonded to Si, the atom or group may be different as far as the atom and the group are within the above-mentioned definitions, for example, where two $R_{III}$'s are attached to Si, one may be alkyl and the other may be alkoxy.

With respect to fluorine-substituted hydrocarbon groups, those having a perfluoro groups such as $CF_3(CF_2)_a-$,

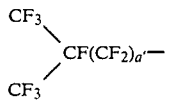

and the like where a and a' are integers, at one end of the molecular structure, are particularly preferable. As to the length of the perfluoro group, two or more carbon atoms are preferable, and the number of $CF_2$ following $CF_3$ in $CF_3(CF_2)_a-$ is preferably 5 or more.

The perfluoro group may be a straight chain or branched chain, for example, the perfluoro group may be branched such as

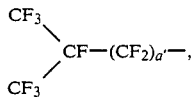

and a' is preferably 4 or more. The releasing property in the present invention is due to the perfluoro group.

The releasing material used in the present invention has at least one alkoxysilane group or silane halide group at one end of the molecule to which a perfluoro group does not attach. Alkoxysilane group, $-SiOR_I$ and silane halide group, $-SiX$, react with moisture to become $-SiOH$, which is bonded to the master surface by dehydration condensation or hydrogen bond with $-OH$ group present on the surface of the master material such as metal and the like.

The releasing material used in the present invention is chemically bonded to the surface of the master for molding at one end and covers the master surface by orienting the perfluoro group present at the other end, and thereby there can be formed a thin, durable and uniform releasing layer.

The perfluoro group may be directly or indirectly, through a structure unit such as $-(CH_2)_l-$, $-O-(CH_2)_l-O-$, $-NH-(CH_2)_l-NH-$, $-(CH_2)_l-O-(CH_2)_l-$, $-(CH_2)_l-NH-(CH_2)_l-$, $-CONH-(CH_2)_l-$, $-COO(CH_2)_l-$ and the like, bonded to Si atom to which alkoxysilane group or halide group is attached. The structure unit is preferably short, for example, l is 3 or less.

Representative compounds are:

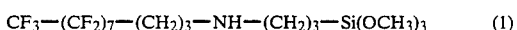
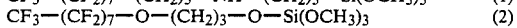
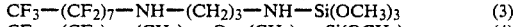
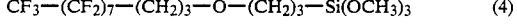

-continued

CF$_3$—(CF$_2$)$_6$—CONH—(CH$_2$)$_3$—Si(OC$_2$H$_5$)$_3$ (5)
CF$_3$—(CF$_2$)$_7$—(CH$_2$)$_3$—Si(OCH$_3$)$_3$ (6)
CF$_3$—(CF$_2$)$_6$—COO—(CH$_2$)$_3$—Si(OCH$_3$)$_3$ (7)
CF$_3$—(CF$_2$)$_7$—(CH$_2$)$_3$—NH—(CH$_2$)$_3$—SiCl$_3$ (8)
CF$_3$—(CF$_2$)$_7$—O—(CH$_2$)$_3$—O—SiCl$_3$ (9)

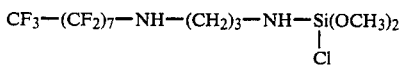   (10)

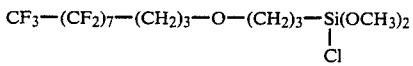   (11)

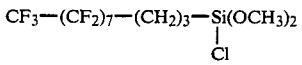   (12)

The above-mentioned fluorine type releasing materials are usually solid so that they are dissolved in an organic solvent to form a solution for applying to the surface of the master. Though the solvent used depends on the molecule structure of the releasing material, a fluorinated hydrocarbon series solvent or a mixture of said solvent and some organic solvent is usually preferred. For example, there may be used CCl$_2$F—CCl$_2$F, CCl$_2$F—CClF$_2$, or a mixture of said fluorinated hydrocarbon solvent and an organic sholvent mutually soluble therewith such as methanol, ethanol, acetone, trichloroethylene and the like. The concentration of the coating solution is not critical, but a low concentration such as 1–3% by weight is sufficient since a thin releasing layer is a desired feature.

The coating solution may be applied to the surface of the master by an ordinary coating method such as dipping, spray coating, brush coating and the like. Since attaching of dirt and dust is not preferred for optical members, it is necessary to remove dirt and dust from the coating solution, coating atomosphere and master. After coating, the coated solution was naturally dried to evaporate the solvent to produce a dried film. The thickness of the film is not critical, but 20μ or less is preferable. It is further preferable that the thickness is reduced to 1μ or less by a film-thinning treatment as mentioned later.

It is effective that there is conducted a treatment for adhering strongly the releasing layer to the surface of the master, if desired, the releasing material is treated so as to be chemically bonded to the surface of the master. This treatment can be effectively carried out in some cases in the presence of a polyhydric alcohol. An example of this treatment is a treatment with amines or acids. For Example, after applying a releasing material to the master, the resulting master is subjected to a heat treatment in a liquid containing an amine. The amines used here may be any of primary, secondary and tertiary amines, preferably primary and secondary amines. There may be used primary amines such as ethyl amine, propyl amine, butyl amine, amyl amine, hexyl amine and the like, and secondary amines such as diethyl amine and the like. These amines are water-soluble amines and at least 20 percent by weight of the amines can be dissolved in water.

Since it is required that the amines are diffused from the treating liquid into a releasing layer and react with alkoxysilane groups or silane halide groups of the releasing material to accelerate the dehydration condensation with —OH at the surface of the underlying master, amines of a simple molecular structure, a low molecular weight and capable of easily diffusing into the releasing material layer are preferable. Concentration of the amine is preferably about 15% by weight or less, more preferably about 0.5–3% by weight.

Another action of the treating liquid is a hydrolysis of —Si—OR$_f$ or SiX at the end of the releasing material to —SiOH, and therefore, it is necessary that the treating liquid contains water. Thus, an aqueous amine is used.

The treatment in the treating liquid is preferably carried out at 60°–95° C. for about 0.5–3 hours. Though elevated temperatures are preferable to accelerate the reaction, the above-mentioned temperature range of from 60° to 95° C. is desirable since water begins to boil at a temperature over 95° C. and bubbles are vigorously formed to attach the surface of the master resulting in that the releasing layer is mechanically peeled off.

According to a preferable example of the present invention, the releasing layer may be formed by applying preliminarily an aqueous solution of an amine or acid to the surface of a master, drying the solution and then applying a releasing material having at least perfluoro group, and alkoxysilane group or silane halide group.

Amines are preliminarily applied to the surface of a master upon the releasing treatment, and are bonded to the surface of the master by forming hydrogen bond with —OH group present at the surface of glass or metal used as a master, or by a simple absorption. A releasing material is then applied to the surface thus threated and subjected to a hot water treatment (infra) to cause hydrolysis of —SiOR$_f$ or —SiX to —SiOH and further, dehydration condensation with —OH at the surface of the master. At this stage, the amines exhibit a catalytic action. In view of the foregoing, water is essential. It is desirable to use the amine preliminarily as an aqueous amine. However, the releasing material used thereafter is not soluble in water so that, in a state that the surface of the master is wetted with water or amine of the solution after the amine treatment, when the releasing material is applied to the wetted surface of the master, the releasing material is precipitated from the coating solution resulting in failing to produce a uniform coated film. Thus, it is necessary to dry, at any rate, the master after coated with the amine solution. However, since it is meaningless to remove completely amines from the master surface, the drying is desirably air-drying or, at most, drying at about 60°–70° C. for a short time.

After coating the amine preliminarily on the master followed by drying, the above-mentioned step of coating the releasing material is carried out. The master thus coated with the releasing material is treated in a hot water. This treatment is necessary to diffuse water to the surface of the master through the releasing layer and accelerate hydrolyzing the alkoxysilane group or silane halide group in the releasing material together with a preliminarily coated amine and bonding to —OH group at the surface of the master. Therefore, high temperatures are desirable from the standpoint of reaction acceleration, but when water boils, the resulting bubbles destroy the releasing layer to form pinholes or cause other damages so that the temperature should be carefully selected. Preferable temperature is 60°–95° C. and preferable treating time is about 0.5–3 hours.

According to another preferred embodiment, the releasing treating agent having a perfluoro group, and an alkoxysilane group or silane halide group is applied to a master and soaked in an aqueous acid to form a releasing layer.

The master coated with the releasing material is subjected to a heat treatment particularly in an aqueous acid. As the acids used here, there may be mentioned inorganic acids such as hydrochloric acid, nitric acid, sulfuric acid, phosphoric acid and the like, and organic acids such as formic acid, acetic acid, oxalic acid, toluenesulfonic acid and the like. These acids diffuse from the treating solution to the interface between the master surface and the releasing material film through the releasing material film, then react with the alkoxysilane group or silane halide group to hydrolyze it to —SiOH and act catalytically to cause condensation with —OH group present at the surface of the master. In the above procedure, since water is necessary to convert —SiOR$_l$ or —SiX to —SiOH, these acids are used in a form of an aqueous solution, and it is preferable that the acid concentration is 5% by weight or less and the pH of the treating solution is 3.0 or less. The treating conditions in the treating solution are usually about 60°–90° C. for about 0.5–50 hours. High temperatures are desirable to accelerate the reaction, but at temperatures higher than 95° C., there occurs boiling and the resulting bubbles sometimes disadvantageously exfoliate the releasing material.

Both amines and acids are used in a form of an aqueous solution for the treatment. High temperatures are desirable from the standpoint of accelerating the reaction, but the bubbles formed upon boiling of the treating solution disadvantageously exfoliate the releasing layer. Therefore, the treating conditions are 60°–95° C. for 0.5–50 hours. Even when vigorous boiling does not occur, these are sometimes formed a number of small bubbles on a surface subjected to a releasing treatment. This phenomenon occurs even at a relatively low temperature. Since the surface coated with the releasing material is hydrophobic so that the once formed bubbles can not be easily removed due to the surface energy. In addition, even when the formed bubbles are completely removed by taking out the master from the treating solution and removing water and then the master is soaked in the solution again, bubbles are generated again. The portions of the releasing layer to which bubbles attach naturally can not contact the treating solution so that the above-mentioned chemical treatment does not proceed. In some cases, bubbles are not generated on the surface of the releasing layer, but from the inside of the releasing layer resulting in forming holes in the releasing layer and exposing the surface of the master. In order to avoid such undesirable phenomena, as a medium for the treating solution containing an amine or acid, there are used polyhydric alcohols, for example, dihydric alcohols and trihydric alcohols of high boiling point and mutually soluble with water such as ethylene glycol, polyethylene glycol, glycerine and the like. That is, there is used a treating solution produced by dissolving an amine or acid and water necessary for the above-mentioned reaction in a polyhydric alcohol. As a result of various experiments, since it has been found that the water content has an important effect on the generation of bubbles, the amount of water dissolved in the polyhydric alcohol is preferably 5–15% by weight based on the amount of the polyhydric alcohol. The amine or acid may be used optionally in an amount of several % by weight.

In addition to the above-mentioned methods for applying the releasing layer directly to a master, there have been developed methods for applying the releasing material to a master preliminarily treated with an amine or acid solution. In this case, after applying the releasing material, a heat treatment is effected with water only in a procedure similar to that of the above-mentioned two methods, and small bubbles are also formed and the behaviors of the bubbles are the same as those in the above cases. When, upon the heat treatment after applying the releasing material, a solution of the polyhydric alcohol in which 5–15% by weight of water is dissolved is used in place of using only water, bubbles are not generated during the treatment and a releasing layer free from pinholes and other defects can be formed on the master.

The releasing layer thus formed may be subjected to a film-thinning treatment, if desired. This film-thinning treatment is effected such that at least the releasing material chemically bonded to the surface of the master is left uniformly on said surface and the other portion of the releasing materaial is removed. As a means for removal, there may be mentioned a rubbing treatment to the releasing layer, a treatment of dissolving away the surface portion of the releasing layer with a solvent, in particular, preferably, ultrasonic cleaning in a solvent such as a fluorinated hydrocarbon solvent and the like for removing excess releasing material, and a treatment that a resin is once cured on the surface of the releasing layer and then, separated resulting in leaving only a thin releasing layer bonded to the master surface.

If desired, there may be effected a heat treatment at 100°–150° C. for 1–2 hours after the above mentioned film-thinning treatment so as to accelerate the bonding to the master surface and convert to a stronger releasing layer.

As a resin for forming the resin layer, there may be used, for example, acrylic monomers such as methyl methacrylate and the like, oligomers thereof, styrene, a mixture of comonomers mainly composed of styrene for the purpose of copolymerization, oligomers thereof, and prepolymers of epoxy resin or unsaturated polyester resins and the like.

The following examples are given for illustrating the present invention.

EXAMPLE 1

A master as shown in FIG. 1 was produced by adhering a master having a polished aspherical surface to a circular plate of BK-7 glass of about 50 mm in diameter and about 10 mm in thickness.

This master was dipped in a solution of a fluorine series organic siloxane compound, FS-116 (tradename, supplied by Daikin Kogyo K.K.) diluted to about 3 times with a fluorine series solvent, Daiflon S-3 (tradename, supplied by Daikin Kogyo K.K.) to apply uniformly the FS-116 to the surface of the master followed by natural drying to form a releasing layer 3 as shown in FIG. 2. As shown in FIG. 3, at the center portion of a support member 5 of brass was placed a glass substrate 4 made of a glass material SF-4 in a form of a lens having a concave sphere surface, and spacer 7 was provided which was able to form a gap of about 0.3 mm at maximum and about 0.1 mm at minimum between the glass substrate and the master. Then, a small amount of a liquid resin 6 composed of a transparent epoxy resin and an aliphatic amine series hardening agent was placed at the recess portion of glass substrate 4 and then the master was inserted as shown in FIG. 4. The resin was thermally cured in a thermostat at 80° C. for 3 hours and taken out from the thermostat after gradually cooled and then the glass substrate adhered, through the cured epoxy resin, to the surface of the master was taken out from support member 5. The glass substrate with a cured resin layer 8 was easily released by applying a light impact with a razoredge which was put along the surface of the master, and a lens composed of the glass substrate and the resin layer as shown in FIG. 5 was formed. A surface of the lens is an aspherical surface of an extremely high percision necessary for optical members. Infrared absorption spectrum of FS-116 is shown in FIG. 6. It is clear from the chart that FS-116 is a compound having $CF_3(CF_2)_n$ group and $Si(OCH_3)_3$ group. In FIG. 6, numeral 11 indicates C-F vibration spectrum, 12 $SiOCH_3$ vibration spectrum and 13 SiO vibration spectrum.

EXAMPLE 2

A special silane for liquid crystal orientation, LP-8T (tradename, supplied by Sinetu Kagaku Kogyo) having a chemical structure of $n\text{-}C_8F_{17}CH_2CH_2 Si(OCH_3)_3$ is diluted with Daiflon S-3 to prepare an about 2 wt. % solution. An experiment was carried out in the same manner as in Example 1 except that the above mentioned solution was used in place of FS-116. Similarly to Example 1, a master and a formed lens were easily released and a lens having an aspherical surface of an extremely high precision was formed.

EXAMPLE 3

A master having a releasing layer formed by using an about 2 wt. % solution of LP-8T as in Example 2 was dipped in a 1 wt. % distilled water solution of n-propylamine and thermally treated at 90° C. for 1 hour. A lens formation experiment was repeated continuously 4 times under the same conditions as in Example 1 without applying any further releasing material to the master, and the releasing was easily effected without any change in the releasing manner. When the above-mentioned thermal treatment was not effected, it was difficult to use the master again.

EXAMPLE 4

A fluorine series siloxane compound having a chemical structure of $C_7F_{15}CONHCH_2CH_2CH_2Si(OC_2H_5)_3$ or $C_7H_{15}COOCH_2CH_2CH_2Si(OCH_3)_3$ was used in place of LP-8T in Example 2 to form a releasing layer as shown in FIG. 2. The releasing layer was dipped in a 1 wt. % aqueous solution of n-butylamine and thermally treated at 90° C. for 1 hour. By using the master having the releasing layer, a lens formation experiment was carried out in the same manner as in Example 1. The lens formation was repeated continuously without applying any further releasing material to the master. Each of the two type of the above-mentioned releasing materials was able to be used twice for releasing when said releasing layer was formed on the master.

EXAMPLE 5

By using FS-116, LP-8T as a releasing material, an about 1 wt. % solution of Daiflon S-3 was applied to the master shown in FIG. 1 by dipping. Next, the releasing layer was thermally treated in an about 3% solution of hydrochloric acid at 90° C. for 1 hour. By using the master thus coated with the releasing layer, a lens formation experiment was carried out in the same manner as in Example 1. A lens having an aspherical surface of an extremely high precision was produced up to 3 times without spplying any further releasing material to the master.

EXAMPLE 6

A master was produced by adhering a master having a polished ashperical surface to a circular plate of BK-7 glass of about 50 mm in diameter and about 10 mm in thickness. This master was dipped in a solution of a fluorine series organic siloxane compound, FS-116 (tradename, supplied by Daikin Kogyo K.K.) diluted to about 3 times with Daiflon S-3 (tradename, supplied by Daikin Kogyo K.K.) to apply uniformly the FS-116 to the surface of the master followed by natural drying.

Next, this master was thermally treated in an about 1 wt. % aqueous solution of n-propylamine at 90° C. for about 1 hour and then subjected to ultrasonic cleaning in Daiflon S-3 (tradename, supplied by Daikin Kogyo K.K.) for about 3 minutes. Before ultrasonic cleaning, a film of FS-116 showed interference color of violet, but after ultrasonic cleaning, the interference color disappeared and became the same state as before the treatment. In this manner, the releasing layer 3 was formed as shown in FIG. 2. As shown in FIG. 3, on the center portion of a support member 5 of brass was placed a glass substrate 4 made of a glass material SF-4 in a form of a lens having a concave sphere surface, and spacer 7 was provided which was able to form a gap of about 0.3 mm at maximum and about 0.1 mm at minimum between the glass substrate and the master. Then, a small amount of a transparent epoxy resin, Epo-Tek 301-2 (tradename, supplied by Epoxytechnology Ltd.) was placed at the recess portion of glass substrate and then the master was inserted as shown in FIG. 4. The resin was thermally cured in a thermostat at 80° C. for 3 hours and taken out from the thermostat after gradually cooled and then the glass substrate adhered, through the cured epoxy resin, to the surface of the master was taken out from support member 5. The glass substrate with a cured resin layer was easily released by applying a light impact with a razoredge which was put along the surface of the master, and a lens composed of the glass substrate and the resin layer as shown in FIG. 5 was formed. The surface of the lens is an aspherical surface of an extremely high precision, the same state as the surface of the master, necessary for optical members. Infrared absorption spectrum of FS-116 is shown in FIG. 6. It is clear from the chart that FS-116 is a compound having $CF_3(CF_2)_n$ group and $Si (OCH_3)_3$ group. In FIG. 6, numeral 11 indicates C-F vibration spectrum, 12 $SiOCH_3$ vibration spectrum and 13 SiO vibration spectrum.

EXAMPLE 7

A special silane for liquid crystal orientation, LP-8T (tradename, supplied by Sinetu Kagaku Kogyo) having a chemical structure of $n\text{-}C_8F_{17}CH_2CH_2 Si(OCH_3)_3$ is diluted with Daiflon S-3 to prepare an about 2 wt. % solution An experiment was carried out in the same manner as in Example 1 except that the above mentioned solution was used in place of FS-116 in Example 6. Similarly to Example 1, a master and a formed lens were easily released and a lens having an aspherical surface of an extremely high precision was formed. The releasing was able to be effected up to 4 times without applying any further releasing material to the master.

EXAMPLE 8

The master member as shown in FIG. 1 was manufactured as an integral whole by cutting a metal material for mold, YSS Maraging Steel YAG (tradename, supplied by Hitachi Kinzoku K.K.). The surface of the master was polished for forming an aspherical surface. The master was coated with an about 2 wt. % Daiflon S-3 solution of the LP-8T by dipping and then thermally treated in an aqueous solution of amylamine at 90° C. for 1 hour. Next, the releasing layer thus formed was subjected to ultrasonic cleaning in Daiflon S-3 for about 5 minutes. The surface of the master finished tidily and showed the same appearance as that of the non-treated master. By using the master, a lens formation was carried out under the same conditions as in Example 6. The glass substrate with a cured resin layer was easily released with a razoredge. The released lens had an aspherical surface of an extremely high precision. The lens having a sufficient precision for optical members was formed up to 4 times without applying any further releasing material to the master.

EXAMPLE 9

A releasing layer on glass master was coated with FS-116 (tradename, supplied Daikin Kogyo K.K.) by dipping in the same manner as in Example 1. The glass master having the releasing layer was thermally treated in an about 3% aqueous solution of HCl at 90° C. for about 1 hour. The resulting glass master was subjected to ultrasonic cleaning in Daiflon S-3. Thereby, the most portion of the film of FS-116 was removed by its dissolution and the surface was finished such that the resulting surface appearance is almost the same as that of the non-treated master. A lens formation experiment was carried out with the master under the same conditions as in Example 6. A lens having the resin layer of the aspherical surface was very easily released and the precision of the lens surface was excellent. The releasing was able to be effected up to 4 times without applying any further releasing material to the master.

EXAMPLE 10

An about 2 wt. % Daiflon S-3 solution of a fluorine series organic siloxane compound, $C_7F_{15}CONHCH_2CH_2CH_2Si(OCH_3)_3$ was used to form a releasing layer under the same manner as the application treatment to the master used in Example 6. The resulting layer was thermally treated in a 1 wt. % aqueous solution of n-butylamine at 90° C. for 1 hour. Thereafter, the master having the releasing layer was subjected to ultrasonic cleaning in Daiflon S-3 for about 3 minutes to wash away the above-mentioned compound adhering to the surface of the master. The surface of the master showed an appearance which was the same as that of the non-treated master.

A lens formation was carried out with the master under the same conditions as in Example 1. The resulting lens was very easily released. The releasing effect was available up to the formation of 4 times.

EXAMPLE 11

An about 2 wt. % solution of a fluorine series organic siloxane compound, $C_7F_{15}COOCH_2CH_2CH_2Si(OCH_3)_3$ in Daiflon S-3 was used to form a releasing layer under the same conditions as the application treatment to the master used in Example 6. The resulting layer was thermally treated in a 1 wt. % aqueous solution of n-butylamine at 90° C. for 1 hour. The master having the releasing layer was subjected to ultrasonic cleaning in Daiflon S-3 for about 5 minutes to wash away the above-mentioned compound adhering to the surface of the master. The surface of the master showed an appearance which was the same as that of the non-treated master.

A lens formation was carried out with the master under the same conditions as in Example 1. The resulting lens was very easily released. The releasing was able to be effected up to 4 times without applying any further releasing material to the master.

EXAMPLE 12

A master (about 25 mm in diameter) as shown in FIG. 1 was produced by adhering with epoxy series adhesives, a master having a polished aspherical surface to a circular plate of BK-7 glass of about 50 mm in diameter and about 10 mm in thickness.

This master was dipped in a solution of a fluorine series organic siloxane compound, FS-116 (tradename, supplied by Daikin Kogyo K.K.) diluted to about 3 times with a fluorine series solvent, Daiflon S-3 (tradename, supplied by Daikin Kogyo K.K.) to apply uniformly the FS-116 to the surface of the master followed by natural drying. Next, the master was treated in a solution composed of 1 wt. % n-propylamine, 5 wt. % water and 94 wt. % ethylene glycol at 90° C. for 1 hour.

No bubble was formed at all on the surface to be treated during the treatment. The master was taken out from the solution, wiped to remove water drops and then subjected to ultrasonic cleaning in Daiflon S-3 for about 3 minutes. By the ultrasonic cleaning excess FS-116 was removed and the appearance of the master became almost the same as that of the non-treated master surface.

As shown in FIG. 3, on the center portion of a support member 5 of brass was placed a glass substrate 4 consituted of SF-4 glass in a form of a lens having a concave sphere surface, and a spacer 7 was disposed which was able to form a gap of about 0.3 mm at maximum and about 0.1 mm at minimum between the glass substrate and the master. Then, a small amount of a transparent epoxy resin, Epo-Tek 301-2 (tradename, supplied by Epoxytechnology Ltd.) was placed at the recess portion of glass substrate 4 and then the master was inserted as shown in FIG. 4. The resin was thermally cured in a thermostat at 80° C. for 3 hours and taken out from the thermostat after gradually cooled and then the glass substrate adhered, through the cured epoxy resin, to the surface of the master was taken out from support member 5. The glass substrate with a cured resin layer was easily released by applying a light impact with a razoredge which was put along the surface of the master, and a lens composed of the glass substrate and the resin layer as shown in FIG. 5 was formed. A surface of the lens is an aspherical surface of an extremely high preceision necessary for optical members.

By using the master, the releasing was able to be effected up to 7 times without applying any further releasing material to the master. Infrared absorption spectrum of FS-116 is shown in FIG. 6. It is clear from the chart that FS-116 is a compound having $CF_3(CF_2)n$ group and $Si(OCH_3)_3$ group. In FIG. 6, numeral 11 indicates C-F vibration spectrum, 12 $SiOCH_3$ vibration spectrum and 13 SiO vibration spectrum.

EXAMPLE 13

A master applied FS-116 was treated in a solution composed of n-propylamine, water and ethylene glycol in Example 12 and then, without subjecting to ultrasonic cleaning in Daiflon S-3, a lens formation experiment was carried out under the same conditions as in Example 12. The formed lens was easily released. Releasing was able to be effected up to 7 times without applying any further releasing material to the master. At the surface of the lens formed at the first time, disorder of interference fringes occurred, but on and after the second times, the lens was excellent without unusualness.

EXAMPLE 14

A special silane for liquid crystal orientation, LP-8T (tradename, supplied by Sinetu Kagaku Kogyo) having a chemical structure of $n-C_8F_{17}CH_2CH_2Si(OCH_3)_3$ was diluted with Daiflon S-3 to prepare an about 2 wt. % solution . An experiment was carried out in the same manner as in Example 13 except that the above mentioned solution was used in place of FS-116 in Example 13. In a way similar to Example 1, the master and the formed lens were very easily released by applying a light impact with a razoredge. When the lens formation was repeated the releasing was able to be effected up to 7 times without applying any further releasing material to the master. The resin surface of the formed lenses had the same high precision as the master except the first lens. The first produced lens showed disorder of order of $\frac{1}{8}\lambda$ in optical interference fringes.

EXAMPLE 15

An about 2 wt. % solution of a fluorine series organic siloxane compound, $C_7F_{15}CONHCH_2CH_2CH_2Si(OCH_3)_3$ in Daiflon S-3 was used to form a releasing layer under the same conditions as the application treatment to the master used in Example 12. The resulting layer was treated in a solution composed of 3 wt. % of HCl, 5 wt. % of water and 92 wt. % of ethylene glycol at 90° C. for 1 hour.

No bubble was formed at all on the surface to be treated during the treatment. Then the master thus treated was subjected to ultrasonic cleaning in Daiflon S-3 for about 3 minutes to wash away the above-mentioned compound adhering to the surface of the master. After the ultrasonic cleaning, the appearance of surface of the master was the same as that of the non-treated master surface.

By using the master, a lens was formed in the same process as in Example 1. The formed lens was very easily released. The releasing effect was available up to the formation of 7 times. A precision of the resin surface of the formed lens was excellent.

EXAMPLE 16

An about 2 wt. % solution of a fluorine series organic siloxane compound, $C_7H_{15}COOCH_2CH_2CH_2Si(OCH_3)_3$, in Daiflon S-3 was used to form a releasing layer under the same conditions as in Example 12. The resulting layer was thermally treated in a solution composed of 1 wt. % of n-butylamine, 5 wt. % of water, and 94 wt. % of glycerine at 90° C. for 1 hour. The master having the releasing layer thus formed was subjected to ultrasonic cleaning in Daiflon S-3 for about 5 minutes to wash away the above-mentioned compound adhering to the surface of the master. The appearance of surface of the master was the same as that of the non-treated master surface.

A lens formation was carried out with the master under the same conditions as in Example 12. The resulting lens was very easily released. The releasing effect was available up to the formation of 7 times. The resulting surface of the lens was such that the master surface was precisely transcribed, and had a very high precision.

EXAMPLE 17

The master member as shown in FIG. 1 was manufactured as an integral whole by cutting and grinding a metallic material for mold, YSS Maraging Steel YAG (tradename, supplied by Hitachi Kinzoku K.K.). The surface of the master was polished for forming an aspherical surface.

The master was coated with an about 3 wt. % solution of FS-116 in Daiflon S-3 and then thermally treated in a solution composed of 1 wt. % of n-butylamine, 5 wt. % of water and 94 wt. % of ethylene glycol at 90° C. for about 1 hour.

Next, the formed releasing layer was subjected to ultrasonic cleaning in Daiflon S-3 for about 5 minutes. The appearance of surface of the master was the same as that of the non-treated master surface. By using the master, a lens formation was carried out in the same process as in Example 12. The lens and the master were easily released with a razoredge. The releasing was able to be effected up to 7 times without applying any further releasing material to the master.

The resulting surface of the lens was such that the master surface was precisely transcribed, and had a very high precision.

COMPARISON EXAMPLE 1

Silicone series paste state releasing material, KS-61 (tradename, supplied by Sinetu Kagaku Kogyo K.K.) was applied, with a nonwoven fabric, to the surfaces of the masters used in Examples 1, 6 and 12. In this time, the master was heated to about 60° C. to soften the releasing layer, and the surfaces were polished as smooth as possible. By using the master, three kinds of lenses were fabricated by the process shown in Example 1, 6 and 12. Upon hardening of a resin, a releasing of a glass substrate was tried with a razoredge. Each of lenses was released partially, but was not able to be released completely.

COMPARISON EXAMPLE 2

The surfaces of the masters used in Examples 1, 6 and 12 were applied by using a solution of a silicone varnish releasing material KS-700 (tradename, supplied by Sinetsu Kagaku Kogyo K.K.) diluted to about 10 times with n-hexane and were polished with a nonwoven fabric in such a way that the precision of the optical curved surface was not degraded and then after printing at 270° C. for 1 hour, were gradually cooled. Next, each of lens formation experiments was carried out under the same conditions as in Examples 1, 6 and 12. The each of the lenses thus formed was not released fully and was cracked at the portion of the glass substrate impacted with a razoredge.

COMPARISON EXAMPLE 3

Each of the masters used in Examples 1, 6 and 12 was beforehand heated to about 80° C., and carnauba wax (m.p. about 65° C.) was applied to the surface of the master by contacting the surface with the carnauba wax and melting said wax. Then, excess molten carnauba wax attaching to the master was wiped with a non-woven fabric to render the surface smooth and then the temperature was returned to room temperature. By using the master, three kinds of lenses were produced under the same conditions as in Examples 1, 6 and 12. Each of the formed lenses was not released fully and a part of the lens was split.

Minute unevenness was observed on the surface of the resin of the released lens by means of the reflection image of the surface. This minute unevenness was due to the irregular wiping of the releasing material.

While the embodiments of the present invention, as herein disclosed, constitute a preferred form, it is to be understood that other forms might be adopted.

What I claim is:

1. A process for producing an optical member comprising forming a resin layer on the surface of a glass substrate by filling with a resin the gap between a master having a releasing layer on the surface and a glass substrate and separating the master to produce an optical member constituted of a glass substrate and a resin layer, characterized in that the releasing layer comprises a compound having a fluorine-substituted hydrocarbon group, and an alkoxysilane group or a silane halide group.

2. The process for producing an optical member according to claim 1 wherein the fluorine-substituted hydrocarbon group is a perfluoro group.

3. The process for producing an optical member according to claim 2 wherein the perfluoro group is:

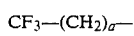

where a is an integer.

4. The process for producing an optical member according to claim 3 wherein $a \geq 5$.

5. The process for producing an optical member according to claim 2 wherein the perfluoro group is:

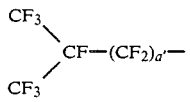

where a' is an integer.

6. The process for producing an optical member according to claim 5 wherein $a' \geq 4$.

7. The process for producing an optical member according to claim 1 wherein the alkoxysilane group is:

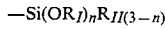

where $R_I$ and $R_{II}$ are alkyl, and n is 1, 2 or 3.

8. The process for producing an optical member according to claim 1 wherein the silane halide group is:

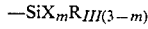

where $R_{III}$ is alkyl or alkoxy, and m is 1, 2 or 3.

9. The process for producing an optical member according to claim 2 wherein the compound forming the releasing layer has a perfluoro group at one end and an alkoxysilane group at an end opposite to the perfluoro group.

10. The process for producing an optical member according to claim 2 wherein the compound forming the releasing layer has a perfluoro group at one end and a silane halide group at an end opposite to the perfluoro group.

11. The process for producing an optical member according to claim 1 wherein the thickness of the releasing layer is 20μ or less.

12. A process for producing an optical member comprising forming a resin layer on the surface of a glass substrate by filling with a resin the gap between a master having a releasing layer on the surface and a glass substrate and separating the master to produce an optical member constituted of a glass substrate and a resin layer, characterized in that the releasing layer comprises a compound having a fluorine-substituted hydrocarbon group, and an alkoxysilane group or a silane halide group and the releasing layer is treated with an amine to make a strong adhesion between the compound forming the releasing layer and the surface of the master by chemical bonding.

13. A process for producing an optical member comprising forming a resin layer on the surface of a glass substrate by filling with a resin the gap between a master having a releasing layer on the surface and a glass substrate and separating the master to produce an optical member constituted of a glass substrate and a resin layer, characterized in that the releasing layer comprises a compound having a fluorine-substituted hydrocarbon group and an alkoxysilane group or a silane halide group, and the releasing layer is treated with an acid to make a strong adhesion between the compound forming the releasing layer and the surface of the master by chemical bonding.

14. The process for producing an optical member according to claim 12 wherein the treatment for the strong adhesion is effected by dipping the master into an aqueous solution of the amine after the formation of the releasing layer on the master.

15. The process for producing an optical member according to claim 13 wherein the treatment for the strong adhesion is effected by dipping the master into aqueous solution of the acid upon formation of the releasing layer on the master.

16. The process for producing an optical member according to claim 12 wherein after application and drying of aqueous solution of the amine on the master, the releasing layer is applied to the master and then the treatment for the strong adhesion is effected by dipping the master into hot water.

17. The process for producing an optical member according to claim 13 wherein after application and drying of aqueous solution of the acid on the master, the releasing layer is applied to the master and then the treatment for the strong adhesion is effected by dipping the master into hot water.

18. The process for producing an optical member according to claim 12 wherein the amine is a primary amine.

19. The process for producing an optical member according to claim 12 wherein the amine is a secondary amine.

20. The process for producing an optical member according to claim 13 wherein the acid is an inorganic acid.

21. The process for producing an optical member according to claim 13 wherein the acid is an organic acid.

22. The process for producing an optical member according to claim 14 wherein the aqueous solution is mixed with a polyhydric alcohol.

23. The process for producing an optical member according to claim 15 wherein the aqueous solution is mixed witha polyhydric alcohol.

24. The process for producing an optical member according to claim 16 wherein the hot water is mixed with a polyhydric alcohol.

25. The process for producing an optical member according to claim 17 wherein the hot water is mixed with a polyhydric alcohol.

26. A process for producing an optical member comprising forming a resin layer on the surface of a glass substrate by filling with a resin the gap between a master having a releasing layer on the surface and a glass substrate and separating the master to produce an optical member constituted of a glass substrate and a resin layer, characterized in that the releasing layer is formed by applying a compound having a fluorine-substituted hydrocarbon group, and an alkoxysilane group or a silane halide group to the master surface and thereafter retaining uniformly all over the whole surface of the master at least the compound bonded chemically to the surface of the master and removing the unbonded compound.

27. The process for producing an optical member according to claim 26 wherein the compound is removed by ultrasonic cleaning.

28. The process for producing an optical member according to claim 26 wherein the compound is removed by separating the resin after hardening of the resin on the surface of the releasing layer.

* * * * *

UNITED STATES PATENT AND TRADEMARK OFFICE
CERTIFICATE OF CORRECTION

PATENT NO. : 4,566,930

DATED : January 28, 1986

INVENTOR(S) : Haruo Uehara

It is certified that error appears in the above-identified patent and that said Letters Patent is hereby corrected as shown below:

Column 1, line 19, change "Other" to --Another--.
Column 2, line 37, change "an" to --a--.
Column 3, line 29, change "characterisitc" to --characteristic--.
Column 4, line 6, change "proply" to --propyl--.
Column 5, line 26, change "sholvent" to --solvent--.
Column 5, line 51, change "Example" to --example--.
Column 6, line 30, change "threated" to --treated--.
Column 6, line 44, change "after coated" to --after being coated--.

Column 7, line 34, change "these" to --there--.
Column 7, lines 36-7, change "temperature. Since" to --temperature since--.
Column 8, line 20, change "materaial" to --material--.
Column 8, line 28, change "then," to --then--.
Column 8, line 31, change "above mentioned" to --above-mentioned--.

Column 9, lines 24-5, change "above mentioned" to --above-mentioned--.
Column 10, line 1, change "spplying" to --applying--.
Column 10, lines 61-2, change "above mentioned" to --above-mentioned--.
Column 11, line 47, change "under" to --in--.
Column 13, line 3, change "in" to --as in--.

UNITED STATES PATENT AND TRADEMARK OFFICE
CERTIFICATE OF CORRECTION

PATENT NO. : 4,566,930

DATED : January 28, 1986

INVENTOR(S) : Haruo Uehara

It is certified that error appears in the above-identified patent and that said Letters Patent is hereby corrected as shown below:

Column 13, line 22, change "above mentioned" to --above-mentioned--.
Column 13, line 51, change "in" to --by--.
Column 14, line 27, change "in" to --by--.
Column 14, line 40, change "In" to --At--.
Column 15, line 33, change "$CF_3-(CH_2)a-$" to --$CF_3-(CF_2)a-$--.

Signed and Sealed this

Twentieth Day of January, 1987

Attest:

DONALD J. QUIGG

*Attesting Officer*  *Commissioner of Patents and Trademarks*